May 2, 1950 — H. C. ALLEN — 2,506,127
OPTICAL MIXING OF PLAN POSITION INDICATION AND GRAPHICAL INFORMATION
Filed April 30, 1948
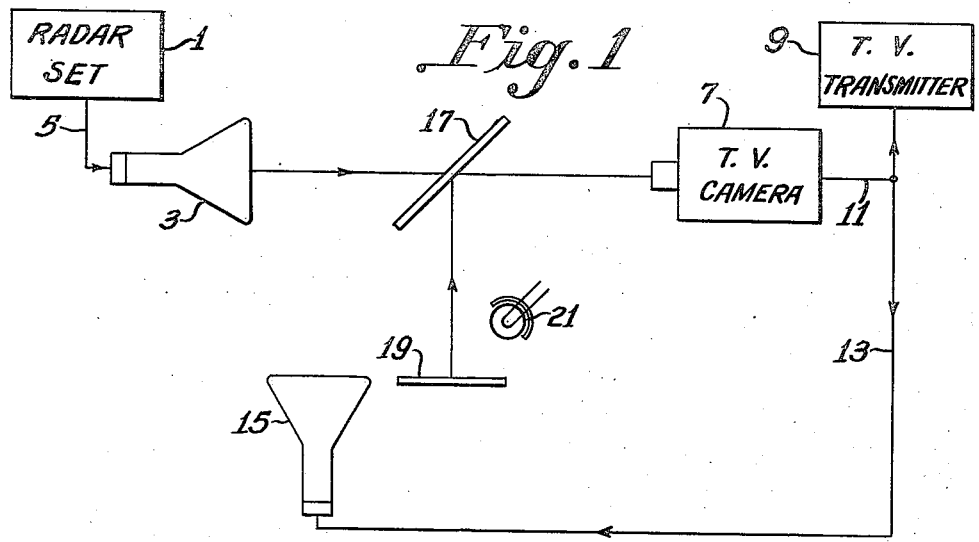
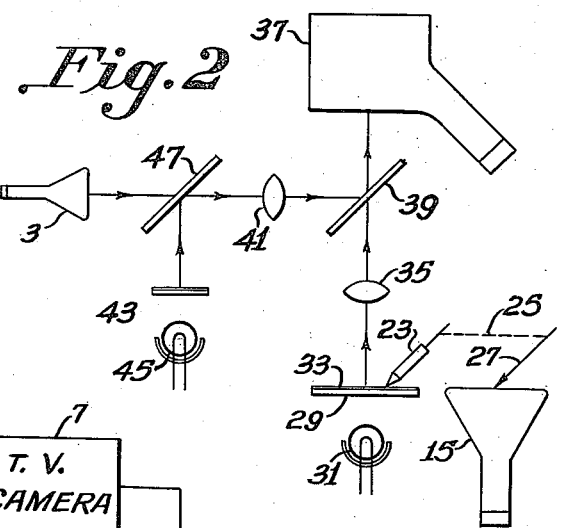
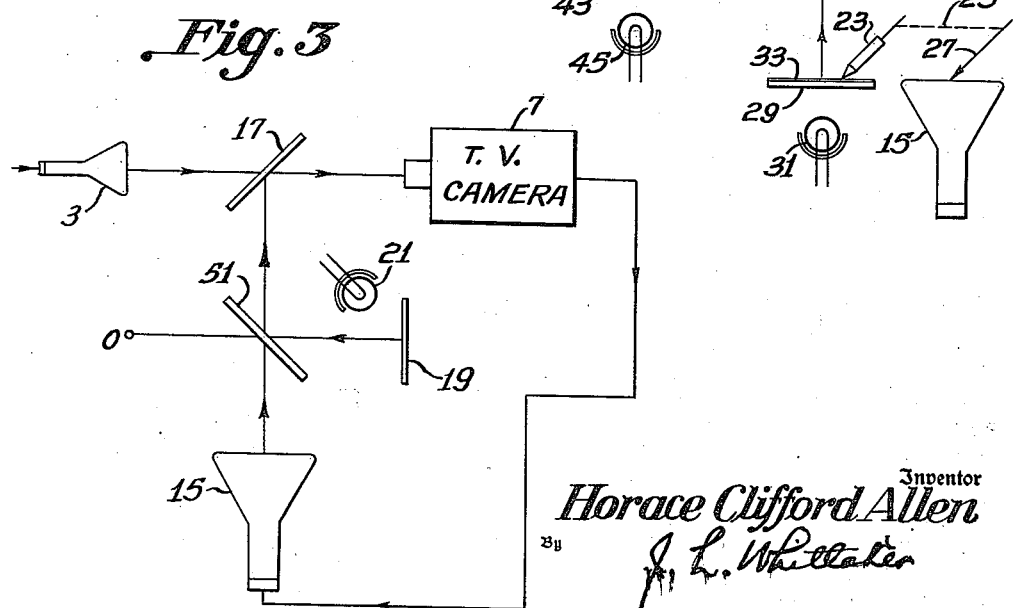
Inventor
Horace Clifford Allen
By J. L. Whittaker
Attorney Patented May 2, 1950

2,506,127

UNITED STATES PATENT OFFICE 2,506,127

OPTICAL MIXING OF PLAN POSITION INDICATION AND GRAPHICAL INFORMATION

Horace Clifford Allen, Princeton, N. J., assignor to Radio Corporation of America, a corporation of Delaware Application April 30, 1948, Serial No. 24,136

2 Claims. (Cl. 178—5.8)

This invention relates to improvements in position indicator systems and more particularly to visual indicators as used for radio traffic control systems of the type wherein the positions of mobile craft such as aircraft within a service area are determined by radar equipment providing a visual map-like display, said display being relayed, together with other pertinent visual information such as a map, by television to the various aircraft concerned. A traffic control system of said type is described and claimed in co-pending U. S. patent application Serial No. 607,999, filed July 31, 1945, by L. F. Jones, now abandoned, entitled Improvement in system of air navigation.

One of the principal objects of the present invention is to provide improved methods and means for optical mixing of visual information from different sources, for transmission as a whole over a single television channel in the form of superimposed images. For example, in traffic control systems of the above-mentioned type, it is desirable to send a map superimposed on the radar positional display, and perhaps written instructions or other visual information as well. Accordingly, it is one of the specific objects of this invention to provide improved methods and means for optically superimposing such other visual information upon a radar display, for transmission by television.

Since it may be desirable from time to time to alter the written instructions or other graphical information in the composite display which is transmitted by television, it is necessary to provide a writing surface, either upon the map or upon some other support, where it is accessible to an operator or controller. A further object of the invention is to provide an improved writing surface particularly adapted for use with a television camera.

Another object is to provide systems of the described type including means which enables the operator or controller to see the composite picture in its relationship to the surface upon which he is writing or about to write, thus facilitating accurate and rapid writing or marking on said surface.

It will be evident to those skilled in the art that the light produced by a radar display is "expensive" light, in that its production involves the use of special luminescent materials and carefully regulated high unidirectional voltage, while light produced by common illuminants such as incandescent or fluorescent lamps is relatively cheap. Accordingly, it is desirable not to waste the light from the radar display, and it is one of the objects of this invention to provide optical mixing of the described type with a minimum loss of said light.

The foregoing and perhaps other objects of the invention will be apparent upon consideration of the following description with reference to the accompanying drawings, wherein:

Figure 1 is a schematic diagram of a relatively simple embodiment of certain features of the invention in an optical mixing arrangement for traffic control systems of the type described in the above-mentioned Jones application, Figure 2 is a schematic diagram of a preferred modification of the system of Figure 1, and Figure 3 is a schematic diagram of a further modification of the system of Figure 1.

Referring to Figure 1, a radar set 1 of known type is provided with a position indicator including a cathode ray oscilloscope 3 which is controlled by output signals from the radar set to show the positions of reflecting objects, such as aircraft, as luminous spots or "pips." The single line 5 represents all of the various connections between the radar set 1 and the oscilloscope 3, including conductors for the intensity and deflection control signals. For purpose of explanation of the invention, it may be assumed that the arrangement is such that the oscilloscope 3 provides a so-called P. P. I. or plan position indication, wherein the luminous spots represent the positions of corresponding objects as viewed from directly above the radar station.

A television camera 7, also of known type, is focussed on the screen of the indicator 3 and supplies output signals to a television transmitter 9. The single line 11 represents the several conductors required to supply deflection signals to the camera, as well as to carry video signals from the camera to the transmitter. Similarly, the line 13 represents the necessary conductors leading to an oscilloscope 15 which is to be used as a monitor and display the picture represented by the signals which modulate the transmitter 9.

A partially reflecting mirror 17 is provided between the indicator 3 and the camera 7, and a surface 19 supporting a map or the like is arranged so that its image is reflected by the mirror 17 to the camera 7. In the illustrated arrangement, the distance from the surface 19 to the camera, by way of the mirror 17, must be made the same as that from the indicator 3 to the camera, in order that both will appear to lie in the same plane as viewed by the camera. It will be evident, however, that the two distances may be made unequal providing a proper arrangement of lenses is included between the camera and the oscilloscope and/or the surface 19. A light source 21 is provided for illuminating the surface 19.

In the operation of the system of Figure 1, the radar set 1 functions in known manner to produce a P. P. I. display on the face of the tube 3, representing the positions of aircraft within the service area as luminous spots. A substantial portion of the light from the radar display passes through the reflector 17. The camera 7 picks up the radar display and provides corresponding video signals.

The map or other graphical representation on the surface 19 is illuminated by the light source 21. Some of the light from the map is reflected by the mirror 17 and the reflected image appears to the camera to be superimposed upon the radar display. The video output from the camera thus represents both the map and the P. P. I. picture. The scale of the map, and its position and orientation, are made to conform with the P. P. I. picture, so the composite television picture will show the aircraft as spots at corresponding positions on the map.

The video signal corresponding to the composite picture modulates the television transmitter 9 for broadcasting to all properly equipped aircraft in the vicinity. The video signal also operates the monitor oscilloscope 15, producing thereon a display like that to be reproduced on board the aircraft. An operator or controller may inscribe on the map information or instructions, such as lines representing wind direction and speed, courses to be followed, or written information, such as weather reports. The inscribed material will appear in the composite television picture as broadcast, and can be observed by the operator at the monitor tube 15.

As mentioned before, light produced by the oscilloscope tube 3 is expensive and must be utilized as efficiently as possible. Hence it is desirable to design the reflector 17 to transmit say 70 percent or more of the light from the tube 3. The cost of lighting the map surface 19 is also not to be ignored, because it is viewed by reflected light and may require that the source 21 be very intense. When the mirror 17 is a more or less panchromatic reflector, such as a partially silvered sheet of glass, a compromise must be effected between the amount of light lost in transmission and the amount lost in reflection.

In accordance with present invention, the mirror 17 is a dichroic reflector, comprising a transparent sheet coated with a thin layer of material having a refractive index different from that of the sheet. Such mirrors are well known in the optical art, and can be designed to transmit 80 percent or more of incident light of one color, while reflecting 80 percent or more of incident light of another color.

The phosphor on the screen of the tube 3 may be one of the highly efficient types, emitting predominantly blue light, for example. The mirror 17 is designed to transmit blue, and will reflect efficiently some other color, such as orange. The light source 21 may be an incandescent lamp, which provides substantial output in the yellow-orange region of the spectrum, or may be a specially designed fluorescent lamp.

With this arrangement substantially all of the available light from the tube 3 will reach the camera 7, and at the same time a minimum of loss will occur in the transfer of light from the support 19 to the camera. Since the camera pick-up tube can be made to respond well to both blue and orange, the difference in color of the two images will have little effect. In this connection, it should be noted that the above-mentioned colors are given only by way of example; other colors, or even invisible light such as ultra-violet or infrared could be used.

The operator, in marking on the map, must watch the monitor tube 15 to see the relationship between the marks he is making and the positions of the various pips in the radar display. This may be somewhat difficult because the monitor and the map surface cannot be seen simultaneously, and the operator must look from one to the other.

The foregoing difficulty is avoided in the system of Figure 2, wherein a marking stylus 23 is mechanically coupled, as indicated schematically by the dash line 25, to a pointer 27 which is manually movable over the face of the monitor tube 15. The mechanical connection 25 may be a pantograph arrangement, a telautograph, or any other well-known system for moving the stylus 23 in accordance with the motions of the pointer 27.

Although an opaque surface could be used as in the system of Figure 1, the writing surface illustrated in Figure 2 is a flat transparent sheet 29, illuminated from below by a source 31 and covered on top with an opaque coating 33 which can be removed by a cutting or scraping action of the stylus 23. The writing surface is projected by a lens 35 upon the photosensitive target of a television pick-up tube 37.

A partially reflecting mirror 39 is provided between the lens 35 and the pick-up tube 37, and is positioned to reflect an image of the radar indicator tube 3 to the pick-up tube 37. A lens 41 is provided to focus the radar image on the pick-up tube target. The mirror 39 is preferably of the dichroic type, designed to reflect the light from the tube 3 (for example, blue) and transmit the light passing through the inscriptions on the writing surface.

In the system shown in Figure 2, the map is on a separate transparency like a lantern slide 43, illuminated by a source 45 and reflected by a partially reflecting mirror 47 disposed between the radar display tube 3 and the lens 41. The mirror 47 may be neutral (i.e. not color selective) and designed to transmit for example 70 percent and reflect 30 percent. It is also possible that the colors of the radar oscilloscope, the map, and the writing surface could be selected so that both mirrors 47 and 39 could be dichroic, the mirror 47 transmitting the color of the tube 3 and reflecting that of the map, while the mirror 39 reflects both of said colors but transmits the color of the writing surface.

In the operation of the system of Figure 2, the composite television picture is displayed, as in the system of Figure 1, upon the monitor tube 15. As the operator moves the pointer 27 over the screen of the monitor tube, the stylus 23 removes opaque material from the writing surface 29, producing bright lines upon the television picture. Thus the operator can see what he is doing and move the stylus properly without difficulty. If desirable, the stylus 23 can carry a small light source at its point to show its position with respect to the television picture before it is lowered to the writing surface.

In the system shown in Figure 3, the monitor tube 15 and the map 19 are superimposed optically by means of a partially reflecting mirror 51, for viewing by an observer at the point O. The mirror 51 also serves to reflect the map 19 to a mirror 17, arranged like the correspondingly designated mirror in the system of Figure 1. The remainder of the system of Figure 3 is like that of Figure 1.

The phosphor on the monitor oscilloscope 15 is made of some color, such as orange, which will be substantially reflected by the mirror 51. The illumination of the map 19 must contain some color which will be transmitted by the mirror 51, as well as some color which will be reflected to and by the mirror 17.

Substantially all of the light from the monitor oscilloscope 15 is reflected to the observation point O, where it appears to come from the plane of the writing surface support 19. The writing surface may be viewed through the mirror 51. The mirror 17 operates as in Figure 1 to superimpose the writing surface upon the P. P. I. display appearing on the tube 3. It will be apparent without further discussion or illustration that the map and/or writing surface shown in Figure 2 could be used in the system of Figure 3 by a combination of the two mirror arrangements.

I claim as my invention:

1. A television transmitting system comprising radio locator means including a cathode ray indicator having a fluorescent screen for producing a luminous display representing information as to the positions of mobile craft in an operating zone, means comprising a lamina carrying a map-like facsimile representing features of said zone and a source of light for flooding said lamina to produce a second luminous display, said fluorescent screen having relatively high efficiency and emitting light of a particular predetermined color whereby said first-mentioned display is predominantly of said particular color, said source and said lamina being of such type and so arranged that said second luminous display includes a substantial amount of light of a different color, a television camera having a photo-sensitive image-receiving area which is responsive to both of said colors, means for optically superimposing said first-mentioned display upon said second display on said image-receiving surface, said last-mentioned means including a dichroic mirror of such a type that in one of its two properties of respectively transmitting and reflecting impinging light it is adapted to transfer a large percentage of impinging light of said particular color, the mirror being arranged in said last-mentioned means to intercept light from said first-mentioned display and to transfer to said image-receiving surface a large percentage thereof and also to intercept and transmit to said surface some light from said second display.

2. A television transmitting system comprising radio locator means including a cathode ray indicator having a fluorescent screen for producing a luminous display representing information as to the positions of mobile craft in an operating zone, means comprising a lamina carrying a map-like facsimile representing features of said zone and a source of light for flooding said lamina to produce a second luminous display, said fluorescent screen having relatively high efficiency and emitting light of a particular predetermined color whereby said first-mentioned display is predominantly of said particular color, said source and said lamina being of such type and so arranged that said second luminous display includes a substantial amount of a color contrasting with that of said first display, a television camera having a photo-sensitive image-receiving area which is responsive to both of said colors, means for optically superimposing said first display upon said second display on said image-receiving surface, said last-mentioned means including a dichroic mirror adapted to transmit a large percentage of light of one of said colors and to reflect a large percentage of light of the other, the mirror being arranged in said last-mentioned means to intercept light from each of said displays and to transfer a large percentage of it to said image-receiving surface.

HORACE CLIFFORD ALLEN.

REFERENCES CITED

The following references are of record in the file of this patent:

UNITED STATES PATENTS

| Number | Name | Date |
| --- | --- | --- |
| 1,927,900 | Philpott | Sept. 26, 1933 |
| 2,027,527 | Hammond | Jan. 14, 1936 |
| 2,122,918 | Phinney | July 5, 1938 |
| 2,150,551 | Kemp | Mar. 14, 1939 |
| 2,262,942 | Jones | Nov. 18, 1941 |
| 2,275,026 | Bedford | Mar. 3, 1942 |
| 2,298,476 | Goldsmith | Oct. 13, 1942 |
| 2,307,029 | Elm | Jan. 5, 1943 |
| 2,352,777 | Douden | July 4, 1944 |
| 2,405,252 | Goldsmith | Aug. 6, 1946 |

FOREIGN PATENTS

| Number | Country | Date |
| --- | --- | --- |
| 295,210 | Great Britain | Aug. 9, 1928 |
| 323,818 | Great Britain | Jan. 13, 1930 |
| 326,603 | Great Britain | Mar. 20, 1930 |